Patented June 30, 1931

1,812,615

UNITED STATES PATENT OFFICE

EUGENE WOLGAMUTH WALL, OF PHILADELPHIA, PENNSYLVANIA, ASSIGNOR TO KALI MANUFACTURING CO., OF PHILADELPHIA, PENNSYLVANIA, A CORPORATION OF PENNSYLVANIA

SULPHONATED SUBSTANCES AND PROCESS OF PREPARING THE SAME

No Drawing. Application filed March 23, 1929. Serial No. 349,522.

The invention relates to sulphonated products and to the method of making the same.

Objects of the invention are to provide a product of the above character of superior qualities for certain purposes than those possessed by any previously known and to provide a novel and improved method of making the same.

A further object is to provide a product of the above character which will form a soluble compound with the ingredients of hard water.

This process consists in first sulphonating fatty acids and glycerides as hereinafter set forth and adding aliphatic amines thereto, which combines with the sulphonated oleaginous compound to form the corresponding sulpho fatty ester and fatty ester of the fatty acid. Sulphonated oleaginous compounds produced in this way have the valuable property of dissolving in hard waters containing salts of calcium and magnesium or other salts of the alkaline earths without the formation of the insoluble soaps corresponding to these alkaline earths. Not all the amines have this property but only those which have a stronger basicity than the salt of the alkaline earth in question, such as calcium carbonate, magnesium carbonate, or their bicarbonates and the like.

I have also found that, if sulphonated oleaginous compounds made from fatty acids or glycerides, either alone or mixed, which by any of the usual methods of sulphonation and neutralization give solid and semi-solid oleaginous compounds, are prepared with the above mentioned compounds, namely aliphatic amines, they give products much improved from the standpoint of fluidity and solubility and are hence of great commercial value for certain purposes.

In carrying out the process, I take 100 pounds of castor oil or any other vegetable, animal or fish oil, any fat or fatty acid or glyceride or mixtures of same and add to this gradually an acid of the sulphuric series. The acid can be sulphuric acid, oil of vitriol, oleum, sulphur trioxide, anhydrous sulphuric acid, chlorosulphonic acid, or any other acid of this series usable for producing a sulphonated oleaginous compound. The percentage of sulphuric acid used I vary according to the oil or other substances treated therewith. The sulphuric acid and oil mixture is agitated, for say one hour, preferably keeping the temperature below 50° C. I do not however limit the time of agitation as this will depend upon the product I wish to manufacture.

After the agitation, the oil and acid mixture is washed with water, or a solution of alkalies such as sodium carbonate or sodium hydroxide, or a solution of alkali salts such as sodium chloride or sodium sulphate, or other salts and allowed to stand until the sulphonated oleaginous base separates from the solvent. The solvent is drawn off and, to the sulphonated oleaginous base remaining, caustic alkali is added until litmus paper test indicates all the mineral acid present is neutralized. I then add triethanolamine or any other suitable amine until the resulting product gives a clear solution when mixed with a standard hard water containing one gram of calcium chloride per liter of water.

In preparing my product I can use any alkali for the neutralization of the mineral acid and also I do not confine myself to the additions of alkali until the mineral acid is all neutralized, but can add further quantities of alkali and finally finish off the product with a triethanolamine or other amine, or I can completely neutralize the sulpho fatty acid with triethanolamine or other amine without the previous addition of an alkali. That is to say, I find that the presence of triethanolamine or amines having greater basicity than lime and magnesia or other alkali earth, give to the sulphonated oleaginous compound the valuable property of mixing with hard waters giving a clear solution when added in suitable amounts.

As a specific example of the herein described process, I take 100 grams of castor oil and add to it, with constant agitation, 25 grams of oil of vitriol. During the addition of the oil of vitriol, external cooling should be resorted to so that the temperature shall not rise above 35° C. After the acid has been added, the mixture is agitated for at least one hour. A wash solution is prepared containing 30 grams of sodium sulphate (Glauber's salt) dissolved in 200 grams of water and to this the above described oil and acid mixture is added and thoroughly agitated to insure uniform mixing. This is allowed to stand until the sulphonated oil product separates from the wash water in a clear layer, whereupon the wash water is drawn off. I now add triethanolamine to the sulphonated oil product until a clear oil completely soluble in water to a clear solution is produced. The quantity of triethanolamine required is usually between 15 and 20 grams, and between these limits varies with the degree of sulphonation, the additions being continued until a water solution of the oil produced gives a neutral reaction to litmus. 10 grams of the oil thus prepared, dissolved in 25 cc. of a standard hard water solution containing 1 gram of calcium chloride per litre and diluted with an additional 25 cc. of water, show no separation of insoluble calcium soaps.

I claim:—

1. The process of producing a substance which will form a soluble compound with salts of the alkaline earth of hard waters, consisting in adding ethanolamines to sulphonated oils.

2. The process of producing a substance which will form a soluble compound with the salts of the alkali earths of hard waters consisting in sulphonating oils, fats, fatty acids, glycerides, or mixtures thereof, washing and adding an ethanolamine until the resulting product will give a clear solution when mixed with a standard hard water.

3. The process of producing a substance which will produce a soluble soap with salts of the alkaline earths which consists in adding to a sulphonated ester an amine of greater basicity than the alkali earth in question.

4. The process of producing a substance which will form a soluble soap with a salt of an alkaline earth consisting in treating an ester with an acid of the sulphuric series, agitating for a suitable length of time, washing the product with water or an alkali solution, allowing the same to stand until the sulphonated product separates from the solution, drawing off the solution, adding caustic alkali to the sulphonated product remaining until all of the mineral acid is neutralized and then adding an ethanolamine until a test with hard water gives a clear solution.

5. A sulphonated oleaginous compound fluidified by an ethanolamine.

6. A sulphonated oleaginous compound fluidified by tri-ethanolamine.

7. The process of producing a substance which will form a soluble compound with salts of the alkaline earth of hard waters, consisting in adding to sulphonated oils an amine of greater basicity than the alkaline earth in question.

8. The process of producing a substance which will form a soluble compound with salts of the alkali earths of hard waters, consisting in sulphonating oils, fats, fatty acids, glycerides, or mixtures thereof, washing and adding an amine of greater basicity than the alkali earths in question until the resulting product will give a clear solution when mixed with a standard hard water.

In testimony whereof I have signed my name to this specification.

EUGENE WOLGAMUTH WALL.